United States Patent

[11] 3,573,662

[72] Inventor Theodore A. Fulton
North Plainfield, N.J.
[21] Appl. No. 753,987
[22] Filed Aug. 20, 1968
[45] Patented Apr. 6, 1971
[73] Assignee Bell Telephone Laboratories, Incorporated
Murray Hill, N.J.

[54] WEAK-LINK SUPERCURRENT PULSE GENERATORS
16 Claims, 10 Drawing Figs.

[52] U.S. Cl. .......... 331/107, 307/277, 307/306
[51] Int. Cl. .......... H03k 3/38
[50] Field of Search .......... 331/107, 107 (S); 307/245, 277, 306

[56] References Cited

UNITED STATES PATENTS 3,423,607 6/1966 Kunzler et al .......... 331/107(S)

OTHER REFERENCES

DeGennes, Reviews of Modern Physics, Jan. 1964, pp. 225, 226, 235—237. (331-107S)

Meyers, IBM Technical Disclosure Bulletin, Vol. 4, Dec. 1961, p. 94. (307—306)

Silver et al., Physical Review, Vol. 158, June 10, 1967, pp. 423—425. (331-107S)

Zimmerman et al. (1), Physical Review, Vol. 141, Jan. 1966, pp. 367—375. (331-107S)

Zimmerman et al. (2), Applied Physics Letters, Vol. 9, Nov. 15, 1966, pp. 353—355. (331-107S)

*Primary Examiner*—Roy Lake
*Assistant Examiner*—Siegfried H. Grimm
*Attorneys*—R. J. Guenther and Arthur J. Torsiglieri

ABSTRACT: A weak-link supercurrent pulse generator includes an inductive-resistive circuit connected across an interfacial region having a finite zero voltage current characteristic of, but not limited to, Josephson tunnel junctions. When driven by a current in excess of a critical supercurrent the device generates nanosecond pulses at gigahertz frequencies.

Patented April 6, 1971 3,573,662

2 Sheets-Sheet 1

INVENTOR
T. A. FULTON
BY David P. Kelley
ATTORNEY

WEAK-LINK SUPERCURRENT PULSE GENERATORS

BACKGROUND OF THE INVENTION

This invention relates to pulse generators, and more particularly to supercurrent pulse generators which have a current-voltage characteristic analogous to that of Josephson tunnel junctions.

In a paper entitled "Possible New Effects in Superconductive Tunneling," published in the Jul. 1, 1962 issue of Physics Letters, pages 251 to 252, D. B. Josephson predicted theoretically that a supercurrent would flow between two superconductors separated by a thin insulating barrier (i.e., an SIS supercurrent tunnel junction) by a mechanism known as two-particle superconducting tunneling, This effect has been observed and reported by P. W. Anderson and J. M. Rowell in a paper entitled "Probable Observation of the Josephson Superconducting Tunneling Effect" and published in the Mar. 15, 1963 issue of Physical Review Letters, pages 230 to 232.

Other geometries exhibit the supercurrent phenomenon but are not limited to two-particle tunneling. P. W. Anderson and A. H. Dayem describe in Physical Review Letters 13, 195 (1964) a superconducting bridge which has effects nearly identical to those observed in the planar SIS Josephson structure. In U.S. Pat. application Ser. No. 561,624, filed on Jun. 29, 1966 (now U.S. Pat. No. 3,423,607) and assigned to applicant's assignee, J. E. Kunzler et al. teach the existence of supercurrents in point contact structures. Most recently, D. E. McCumber discovered the existence of supercurrent Josephsonlike phenomena in SNS structures, i.e., superconductor-normal metal-superconductor structures, as disclosed in U.S. Pat. application Ser. No. 753,955, filed on Aug. 20, 1968, also assigned to applicant's assignee.

In general, a supercurrent device comprises an interfacial region between a pair of superconductive regions. As pointed out in the previous examples, the interfacial region may be formed in a variety of geometries including SIS, SNS, point contact, and bridge-type structures. The interfacial region in each of the above cases is a weak-link region interconnecting the superconductive regions, the weak link breaking down when a critical current is exceeded. The weak link is the thin insulator in the SIS structure, the normal metal in the SNS structure, the region of contact in the point contact structure and the region of minimum cross-sectional area in the bridge structure.

Each of these structures exhibits effects analogous to, but not limited to, the Josephson two-particle tunneling effect. When the current through the structure is increased from zero, the voltage across the interface remains zero over a range of current below a first critical supercurrent designated $i_J$. When the current flow through the interface exceeds the first critical current, the voltage across the interface abruptly increases to some finite value. Furthermore, when the current is reduced from above to below that critical current, the voltage across the interface remains finite until a second critical current, termed the switchback current and designated $i_o$, is reached whereupon the interface voltage again drops to zero.

In addition to the aforementioned DC properties, Josephson-type supercurrent devices exhibit RF effects which make them useful as pulse generators. That is, when driven by a voltage or current source, the devices generate pulse or sinusoidal signals of frequency $2eV/h$ (typically in the gigahertz range) where $e$ is electronic charge, $V$ is the driving voltage and $h$ is Planck's constant. Typically, the signal generated is of too low an amplitude, e.g., in the order of 1 microvolt, to be of practical value. The present invention, as will be subsequently discussed, is capable of generating gigahertz signals of amplitude in the range of a tenth of a volt or more, an improvement by five orders of magnitude.

SUMMARY OF THE INVENTION

In accordance with the principles of the invention a supercurrent pulse generator comprises an inductive-resistive circuit connected across the weak-link interfacial region between a pair of superconductive regions. When excited by a current in excess of the aforementioned first critical current, the invention generates gigahertz pulses of magnitude of one tenth of a volt or more and of nanosecond duration.

BRIEF DESCRIPTION OF THE DRAWINGS

The invention, together with its various features and advantages, can be easily understood from the following more detailed description taken in conjunction with the accompanying drawings, in which.

DETAILED DESCRIPTION

Current-Voltage Characteristic

Figure 1:
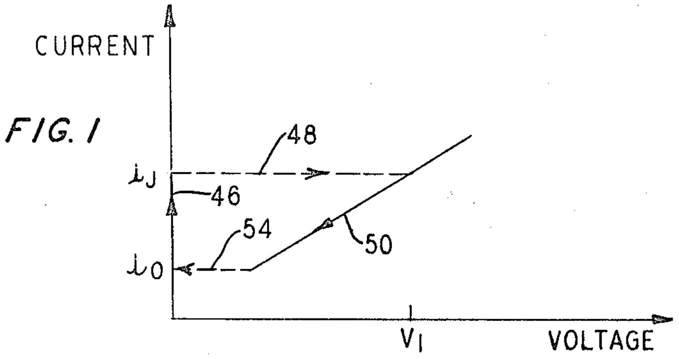
FIG. 1 is a graph of a typical current-voltage characteristic of supercurrent devices utilized in the present invention.

Before discussing in detail the structure and operation of the invention, it would be well to consider a typical current-voltage characteristic exhibited by a supercurrent device which may be used in accordance with the principles of the invention. Turning then to FIG. 1, such an $I$–$V$ characteristic has disjoint stable regions designated by solid lines 46 and 50, and unstable regions designated by dashed lines 48 and 54. Line 46 indicates that at zero voltage across its interfacial region, the supercurrent device is capable of carrying a limited supercurrent $i_J$. Above this first critical current, however, the characteristic of the device jumps (line 48) from a zero voltage state (line 46) to the usual current-voltage characteristic (line 50) with a corresponding increase in voltage across the interfacial region from zero to $V_1$. In summary, in the voltage transition from zero to $V_1$, a supercurrent device exhibits a current-voltage characteristic as shown by the combination of lines 46 and 48.

By way of contrast, the switchback characteristic from $V_1$ to zero for decreasing current is shown by lines 50 and 54. As current is decreased, the voltage decreases along line 50 which has a slope $1/R_N$, where $R_N$ is the intrinsic DC resistance of the device. When the current is decreased below $i_o$, the switchback current, the interfacial voltage abruptly decreases (line 54) again to zero.

General Structure

Figure 2:
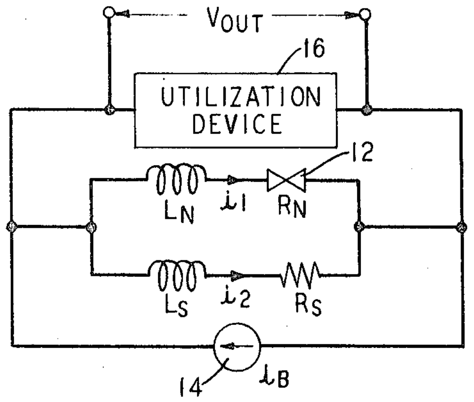
FIG. 2 is a circuit schematic of one embodiment of the invention.

A circuit schematic of the invention which exploits the foregoing properties of supercurrent devices is shown in FIG. 2. A pulse generator in accordance with the invention thus comprises a supercurrent device 12 having an intrinsic resistance $R_N$ (the inverse of the slope of line 50 of FIG. 1) and an intrinsic inductance $L_N$, the latter shown for the purposes of explanation in series connection with the device 12. Connected in parallel with the device 12 is the series combination of a resistance $R_S$ and an inductance $L_S$. The parallel combination is driven by a current source 14 of magnitude $i_B$ which produces a current $i_1$ in the device 12 and a current $i_2$ in the shunt arm comprising $L_S$ and $R_S$. A voltage $V_{out}$ is thus generated across a utilization device 16 connected across the parallel combination.

Operation

Figure 3A:
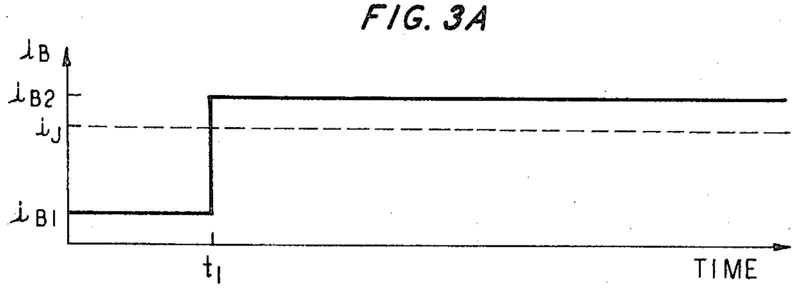
FIG. 3A is a graph of bias current versus time.
Figure 3B:
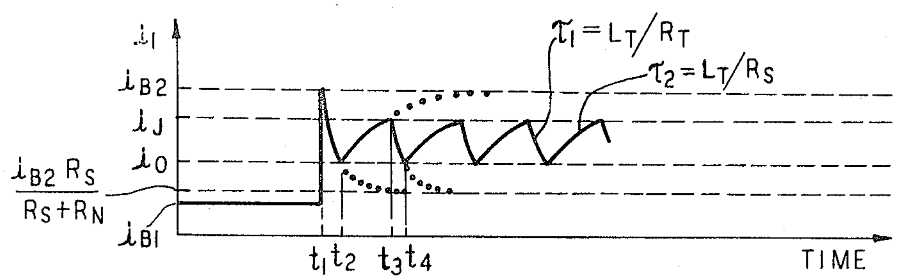
FIG. 3B is a graph of supercurrent device current versus time.
Figure 3C:
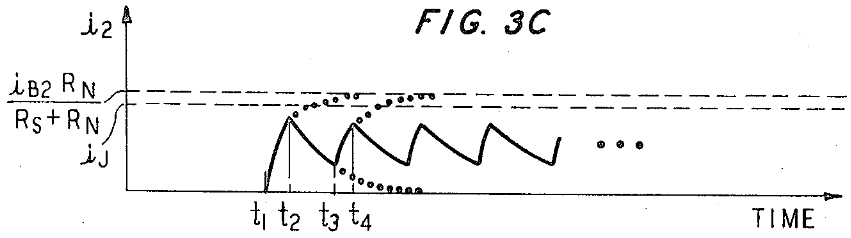
FIG. 3C is a graph of current in the inductive-resistive circuit versus time.
Figure 3D:
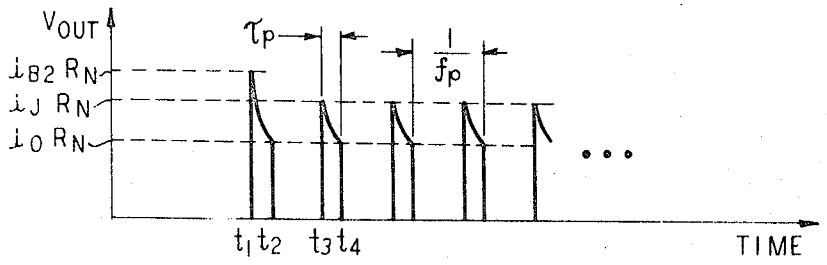
FIG. 3D is a graph of output voltage of the invention versus time.

The manner in which the aforementioned structure generates pulses can be readily understood with reference to FIGS. 3A to 3D. Consider that, as shown in FIG. 3A, the bias current is switched at time $t_1$ from a level $i_{B1}$ below $i_j$ to a level $i_{B2}$ above $i_J$. At time $t_1^1$, $i_1=i_{B1}$, $V_{out}=0$ and therefore $i_2=0$. At time $t_1^+$, however, $i_1$ jumps to $i_{B2}$ (FIG. 3B) where it is assumed for simplicity that $L_S>>L_N$, and the output voltage jumps from zero to $V_{out}=i_1R_N=i_{B2}R_N$ (FIG. 3D). In the interval $t_2-t_1$, $i_2$ increases exponentially (FIG. 3C) toward the level $i_{B2}R_N/(R_N+_S)$, while $i_1$ decreases exponentially with the same time constant $\tau_1\approx(L_N+L_S)/(R_N+R_S)$ toward the level $i_{B2}R_S/(R_N+R_S)$ under the constraint that $i_1+i_2=i_B$. During this interval $V_{out}$ is equal to $i_1R_N$. The current $i_2$, however, never reaches the current level $i_{B2}R_N/(R_N+R_S)$ because $i_1$ reaches $i_o$, the switchback current, first. When $i_1$ $i_o$ at time $t_2$, the voltage across supercurrent device $V_{out}$ drops abruptly to zero (FIG. 3D). Consequently, $i_2$ must exponentially approach zero as it does in the interval $t_3-t_2$. During this same interval, however, $i_1$ increases exponentially with the same time constant $\tau_2=(L_N+L_S)/R_S$ toward $i_{B2}$. At time $t_3$, $i_1$ reaches $i_J$ causing $V_{out}$ to abruptly increase to $V_{out}=i_JR_N$ again, and thus causes $i_2$ to begin to increase again toward $i_{B2}R_N/(R_N+R_S)$. At time $t_4$, $i_1$ decreases below $i_o$, reducing $V_{out}$ to zero (FIG. 3D) and repeating the cycle.

As shown in FIG. 3D, the voltage output of the invention is a train of pulses. It can be shown analytically that the pulse width is given approximately by $$\tau_p=\frac{i_J-i_o}{i_J-\frac{R_Si_{B2}}{R_N+R_S}}\cdot\frac{L_N+L_S}{R_N+R_S} \quad (1)$$

and repetition rate is given approximately by $$f_p=\frac{i_{B2}-i_o}{i_J-i_o}\cdot\frac{R_S}{L_n+L_s} \quad (2)$$

In reference to FIG. 3B it should be noted that in order for switchback to occur (i.e., that $i_1$ be able to reach $i_o$) it is desirable that $$i_o\geq i_{B2}\frac{R_S}{R_N+R_S}$$

Specific Structures

Figure 4:
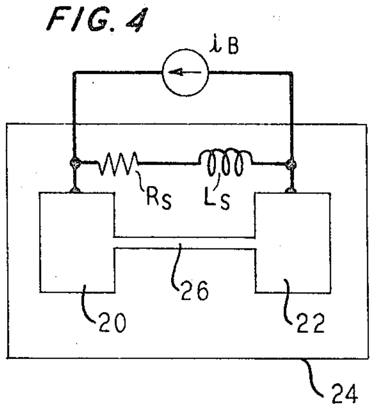
FIG. 4 is a schematic of a superconductive bridge embodiment of the invention.

As shown in FIG. 4 the principles of the invention may be embodied in a supercurrent bridge structure comprising a pair of spaced superconductive thin film regions 20 and 22 deposited on a substrate 24. The regions are connected via a superconductive bridge defined by the elongated member 26 which defines the interfacial region. Current source $i_B$ and the series combination of a resistor $R_S$ and inductor $L_S$ are connected in parallel across superconductive regions 20 and 22.

Typically, the superconductive and interfacial regions comprise a thin film of tin 1,000 A. thick, with the bridge 26 being about 20$\mu$ wide and 350$\mu$ long. $R_S$ may be a brass strip connected across the superconductors having magnitude of about $10^{12}$ ohms. $L_S$ and/or $L_N$ may comprise stray inductance with $L_s+AQN\approx10^{18}$ henry or, if so desired, actual inductive components may be utilized. $R_N$ is usually about 1 ohm and $i_J$ and $i_o$ typically about 50 ma. and 40 ma., respectively. For these values and $i_{B2}=1$ amp., $f_p=0.1$ gigahertz and $\tau_p=2.5$ nanoseconds.

Figure 5:
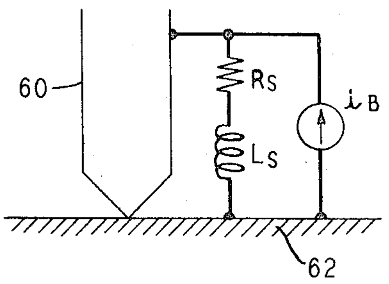
FIG. 5 is a schematic of a point contact embodiment of the invention.
Figure 6:
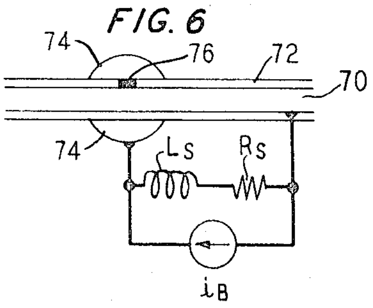
FIG. 6 is a schematic of a solder-blob embodiment of the invention.
Figure 7:
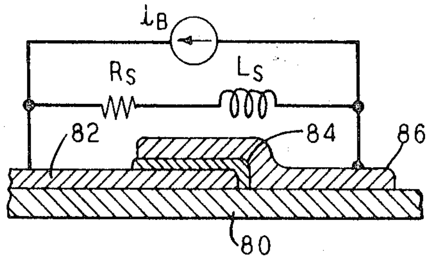
FIG. 7 is a schematic of a planar SIS or SNS embodiment of the invention.

Other geometrical configurations which produce similar results are shown in FIGS. 5, 6 and 7. A point contact structure, as shown in FIG. 5, comprises a tapered superconducting element 60 making body-to-body contact in one or more places with a planar superconductor 62 thereby defining an interface in the regions of contact. The surfaces of superconductor 62 may be curved, however, if so desired. The contact may be either direct (superconductor-to-superconductor) or indirect through an insulative or normal metal layer (not shown) as in SIS and SNS devices, respectively. The taper of element 60 may be one-dimensional only so defining a wedge or may be two-dimensional so defining a point. The taper may be embedded in superconductor 62 or in an insulative or normal metal layer (not shown). As before, a resistive-inductive series circuit ($R_S$ and $L_S$) and a current source $i_B$ are connected across the superconductors 60 and 62.

The embodiment shown in FIG. 6 is colloquially termed a "-solder blob" junction and typically comprises a niobium wire 70 coated with a niobium oxide layer 72. A Pb–Sn solder blob 74 is deposited around a region of the wire defining an interface 76. The shunt circuit $L_S$ and $R_S$ and the current source $i_B$ are connected between the solder blob 74 and the wire 70. Other materials may, of course, be used without departing from the spirit and scope of the invention.

A fourth embodiment, shown in FIG. 7, is a planar structure comprising a substrate 80 upon which is deposited a first superconductor 82, an interfacial layer 84 which overlaps at least a portion of superconductor 82, and a second superconductor 86 which overlaps the aforementioned region of overlap. The interfacial layer 84 may be an insulator as in Josephson SIS tunnel junctions or may be a normal metal as in SNS devices taught by McCumber, supra, (i.e., the thickness of the normal metal is preferably less than the electron coherence length). In the former case the SIS structure is typically Pb–PbO–Pb with the PbO insulator about 10—15 A. thick, whereas in the latter case the normal metal may be, for example, a bismuth layer 1000 A. thick. As with the other embodiments, a series circuit comprising $L_S$ and $R_S$ and a current source $i_B$ are connected in parallel across superconductors 82 and 86.

The operation of the aforementioned specific structural embodiments is substantially as described with reference to FIGS. 1, 2 and 3.

It is to be understood that the above-described arrangements are merely illustrative of the many possible specific embodiments which can be devised to represent application of the principles of the invention. Numerous and varied other arrangements can be devised in accordance with these principles by those skilled in the art without departing from the spirit and scope of the invention.

In particular, the pulse generator of the present invention may be utilized in various AC circuits as a mixer, parametric oscillator, up or down converter and the like by techniques well known in the art. Furthermore, inasmuch as it is well known that $i_J$ and $i_o$ are dependent upon magnetic field and, since $f_p$ is a function of $i_o$ and $i_J$, it follows that the invention could be utilized as a magnetometer by sensing the frequency shift in $f_p$ produced by an unknown magnetic field, which induces changes in $i_o$ and/or $i_J$.

I claim:

1. A supercurrent device comprising:
a pair of superconductive regions;
a weak-link interfacial region joining said superconductive regions;
an inductive-resistive circuit connected across said weak-link interfacial region;
said device having a current-voltage characteristic including disjoint first and second stable regions, said first region being of increasing current at zero voltage and having a first critical current at which the interfacial voltage abruptly increases from the zero voltage to some finite higher value in said second region, and said second region being of decreasing current less than the first critical current and having a second critical current, less than the first critical current, at which the interfacial voltage abruptly decreases to zero in said first region; and
means for applying to said interfacial region current of amplitude greater than the first critical current.

2. The device of claim 1 wherein said interfacial region comprises an insulative member separating said superconductive regions and contiguous with at least a portion of each of said superconductive regions.

3. The device of claim 2 wherein said superconductive regions and said insulative member are planar thin films.

4. The device of claim 2 wherein one of said superconductive regions has a tapered region defining a small cross-sectional area in the vicinity of said interfacial region, and said insulative member is contiguous with the small cross-sectional area of said superconductive region.

5. The device of claim 4 wherein said tapered region of said one superconductive region is one-dimensional defining a wedge.

6. The device of claim 4 wherein said tapered region of said one superconductive region is two-dimensional defining a point.

7. The device of claim 1 wherein said interfacial region comprises a normal metal member separating said superconductive regions and contiguous with at least a portion of each of said superconductive regions.

8. The device of claim 7 wherein said normal metal member has a thickness less than the electron coherence length.

9. The device of claim 7 wherein said superconductive regions and said normal metal member are planar thin films.

10. The device of claim 7 wherein one of said superconductive regions has a tapered region defining a small cross-sectional area in the vicinity of said interfacial region, and said normal metal member is contiguous with the small cross-sectional area of said superconductive region.

11. The device of claim 10 wherein said tapered region of said one superconductive region is one-dimensional defining a wedge.

12. The device of claim 10 wherein said tapered region of said one superconductive region is two-dimensional defining a point.

13. The device of claim 1 wherein one of said superconductive regions has a tapered region defining a small cross-sectional area in body-to-body contact with said other superconductive region, and said interfacial region comprises the region of contact of said superconductive regions.

14. The device of claim 13 wherein said tapered region is one-dimensional defining a wedge.

15. The device of claim 13 wherein said tapered region is two-dimensional defining a point.

16. The device of claim 1 comprising an elongated superconductive member having a narrowed region intermediate the ends thereof defining said pair of superconductive regions on either side of said narrowed region and further defining said interfacial region as said intermediate region.